US006812662B1

(12) United States Patent
Walker

(10) Patent No.: US 6,812,662 B1
(45) Date of Patent: Nov. 2, 2004

(54) PHOTOELECTRIC POWER SUPPLY SYSTEM FOR MOTORIZED WINDOW COVERINGS

(75) Inventor: Winston G. Walker, Littleton, CO (US)

(73) Assignee: Harmonic Design, Inc., Cranbury, NJ (US)

( * ) Notice: Subject to any disclaimer, the term of this patent is extended or adjusted under 35 U.S.C. 154(b) by 51 days.

(21) Appl. No.: 10/114,732

(22) Filed: Apr. 1, 2002

(51) Int. Cl.[7] .................................................. H02P 3/20

(52) U.S. Cl. ....................... 318/280; 318/480; 318/466; 160/309; 160/310; 160/311; 160/331; 160/DIG. 17; 136/243; 136/244; 136/251

(58) Field of Search ................................ 318/280, 282, 318/286, 466, 468, 480; 160/369, 310, 311, 331, DIG. 17; 136/243, 244, 251, 293

(56) References Cited

U.S. PATENT DOCUMENTS 4,727,918 A * 3/1988 Schroeder ...................... 160/5
4,782,276 A * 11/1988 Guterman ................... 318/685
5,274,499 A 12/1993 Shopp ........................ 359/461
5,275,219 A * 1/1994 Giacomel ...................... 160/6
5,583,605 A * 12/1996 Sakamoto ................... 396/159
5,675,487 A * 10/1997 Patterson et al. ...... 364/167.01
5,793,174 A 8/1998 Kovach et al. ............. 318/468
6,060,852 A 5/2000 Domel et al. ............... 318/480
6,189,948 B1 * 2/2001 Lin .......................... 296/97.4
6,388,404 B1 * 5/2002 Schnebly et al. ............. 318/16
6,433,498 B1 8/2002 Domel et al. ............... 318/280

FOREIGN PATENT DOCUMENTS

JP 29028 2/1983 ...................... 1/66
JP 109484 6/1985 ...................... 9/32
JP 61-109890 5/1986 ........... E06B/9/307
JP 192987 8/1989 ...................... 9/32
JP 363495 12/1992 .................... 9/264

* cited by examiner

*Primary Examiner*—Rina Duda
(74) *Attorney, Agent, or Firm*—John L. Rogitz

(57) ABSTRACT

A photoelectric power supply system for motorized window coverings includes a light detector electrically connected to a relatively high dielectric capacitor. In turn, the capacitor is connected to an electric motor, and the capacitor is the primary source of power for the motor. The light detector converts solar energy to electric energy that is used to charge the capacitor. The electric motor utilizes electricity from the capacitor as needed.

14 Claims, 1 Drawing Sheet

PHOTOELECTRIC POWER SUPPLY SYSTEM FOR MOTORIZED WINDOW COVERINGS

FIELD OF THE INVENTION

The present invention relates generally to power supply systems for motorized window coverings.

BACKGROUND OF THE INVENTION

Small, primary direct current (dc) batteries are used in a wide variety of applications owing to their low cost, ease of use, and portability. However, batteries require replacement after discharging. The present invention recognizes the advantages attendant in small dc power sources, and critically observes that their usefulness in many, if not most, applications would be even greater if they could be easily replenished.

One such application is window coverings. Examples of such coverings include horizontal blinds, vertical blinds, pleated shades, roll-up shades, and cellular shades made by, e.g., Spring Industries®, Hunter-Douglas®, and Levellor®.

The present assignee has provided several systems for either lowering or raising a window covering, or for moving the slats of a window covering between open and closed positions. Such systems are disclosed in U.S. Pat. Nos. 6,189,592, 5,495,153, and 5,907,227, incorporated herein by reference. These systems include a motor driven gear box that is coupled to a tilt rod of the window covering. When the motor is energized, the tilt rod rotates clockwise or counterclockwise.

The assignee's systems are powered by batteries and advantageously are not hard-wired into existing wiring of a building or dwelling. Unfortunately, the batteries must be changed periodically. On the other hand, non-battery systems that are powered by utility power can cumbersome and in many cases, impractical to incorporate them into the existing electrical wiring of a house or other building.

As a result, the present invention recognizes a need for a system that will allow motorized window coverings to be powered without the need for batteries or utility power.

SUMMARY OF THE INVENTION

A direct current power system for actuating a component includes a capacitor having a rating of at least one-half Farad. The system further includes a converter that receives light and outputs electricity in response thereto in order to charge the capacitor. Also, a motor is connected to the capacitor and is energized thereby. The capacitor is the primary source of power for the motor.

In a preferred embodiment, the component to be actuated is selected from the group consisting of: window coverings, laptop computers, hand held computers, telephones, lights, toys, and calculators.

In another aspect of the present invention, a batteryless direct current power supply system includes a capacitor and a converter converting light to electricity to charge the capacitor. The capacitor is connectable to an electrical component to power the component without the need for any other source of power.

In yet another aspect of the present invention, a power system for a window covering includes a light detector and a capacitor electrically connected to the light detector. A motor is electrically connected to the capacitor which is the primary source of power for the motor. In this aspect, the motor moves the window covering.

In still another aspect of the present invention, a photoelectric power system includes a light detector and a capacitor that is electrically connected to the light detector. In this aspect, an electrical device is electrically connected to the capacitor, and the capacitor is the primary source of power for the electrical device.

The details of the present invention, both as to its construction and operation, can best be understood in reference to the accompanying drawing, in which like numerals refer to like parts, and which:

BRIEF DESCRIPTION OF THE DRAWING

The FIGURE is a perspective view of a window covering actuator, shown in one intended environment, with portions of the head rail cut away to expose the internal electrical components.

DETAILED DESCRIPTION OF THE PREFERRED EMBODIMENT

Figure 1:
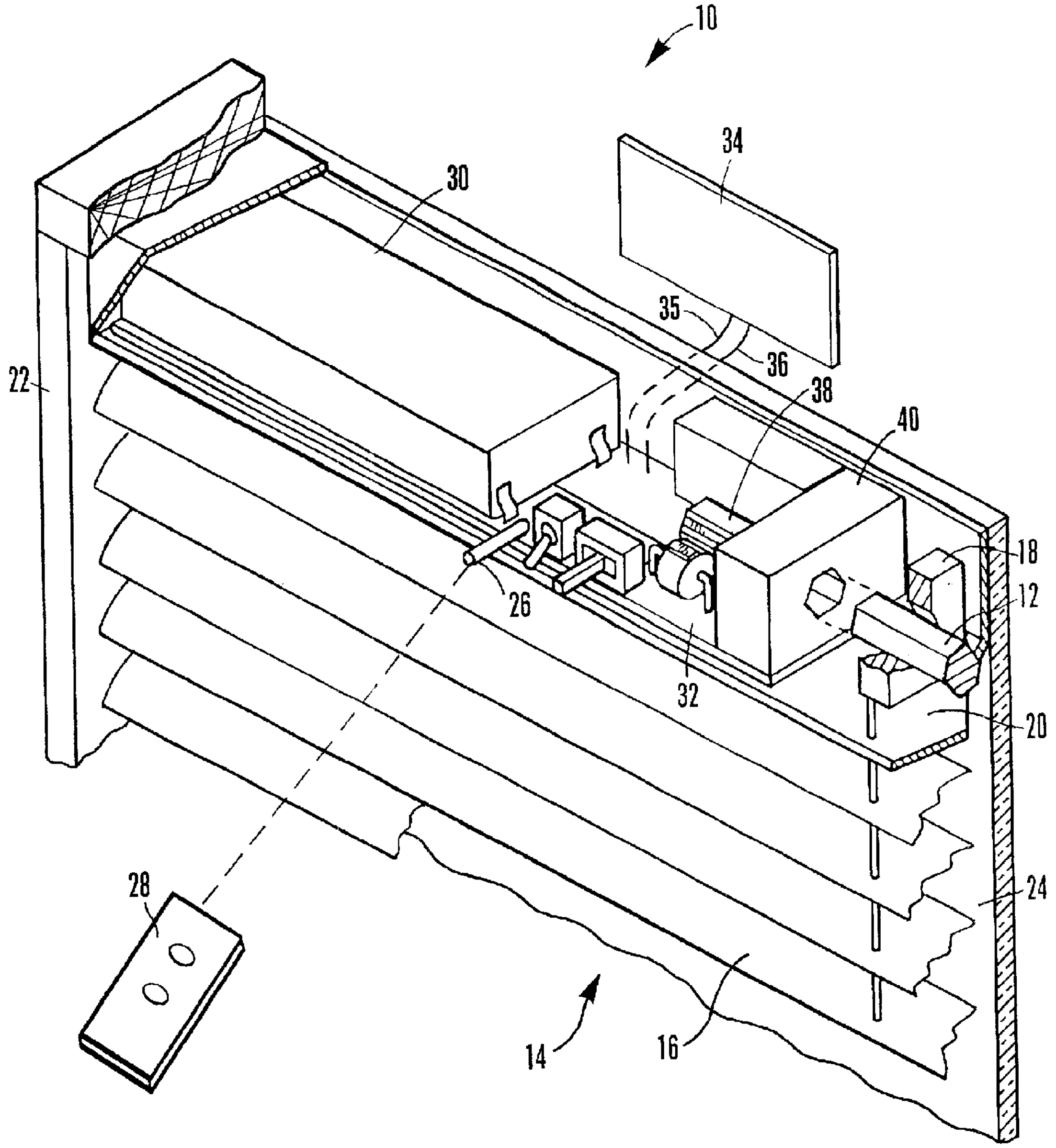

The present invention is directed to portable dc power sources that can be used in a wide range of applications. By way of non-limiting illustration only, referring to the FIGURE, an actuator, generally designated is shown in operable engagement with a rotatable tilt rod 12 of a window covering, such as but not limited to a horizontal blind 14 having a plurality of louvered slats 16. As shown, the tilt rod 12 is rotatably mounted by means of a block 18 in a head rail 20 of the blind 14.

In the embodiment shown, the blind 14 is mounted on a window frame 22 to cover a window 24, and the tilt rod 12 is rotatable about its longitudinal axis. The tilt rod 12 can engage a baton (not shown). When the tilt rod 12 is rotated about its longitudinal axis, the slats 16 rotate about their respective longitudinal axes to move the blind 14 between an open configuration, wherein a light passageway is established between each pair of adjacent slats, and a closed configuration, wherein no light passageways are established between adjacent slats.

While the embodiment described above discusses a horizontal blind, it is to be understood that the principles of the present invention apply to a wide range of window coverings including, but not limited to the following: vertical blinds, fold-up pleated shades, roll-up shades, cellular shades, skylight covers, and any type of blinds that utilize vertical or horizontal louvered slats.

The FIGURE shows that the actuator 10 can include a control signal generator, preferably a signal sensor 26, for receiving a user command signal. Preferably, the user command signal is generated by a hand-held user command signal generator 28, which can be an infrared (IR) remote-control unit or a radio frequency (RF) remote-control unit. Or, the user command signal may be generated by any other means of communication well known in the art. It can be appreciated that the user command signals can be "open," "close," "raise," "lower," "hold," and so on.

As further shown in the FIGURE, a capacitor 30 is mounted within the head rail 20. In the preferred embodiment, the capacitor 30 is one or more relatively high dielectric capacitors such as those manufactured by Cooper Electronic Technologies, North American Capacitor Company, the PowerCache division of Maxwell Technologies, or NESS. Preferably, the capacitor 30 has a capacitance of at least one half Farad (0.5 F). It is to be understood that, in accordance with the present invention, no other power source for the below-described motor, either ac or dc, is present in the window blind actuator 10.

The FIGURE further shows that an electronic circuit board 32 is positioned in the head rail 20 beneath the capacitor 30. It can be appreciated that the circuit board 32 can be fastened to the head rail 20, e.g., by screws (not shown) or other well-known method and the capacitor can be mounted on the circuit board 32. It is to be understood that the capacitor 30 is electrically connected to the electronic circuit board 32. Further, it is to be appreciated that the electronic circuit board 32 may include a microprocessor.

One or more light detectors 34, e.g., photo-diodes, photocells, solar cells, or solar panels, are electrically connected to the circuit board 32 via wires 35 and 36 and can be mounted to the back of the actuator 10 by means well-known in the art, e.g., solvent bonding. Or, the light detector 34 can be distanced from the actuator in order to maximize the impingement of light thereon. It is to be understood that the light detector 34 can convert light energy to electrical energy that is used to charge the capacitor 30. It is to be appreciated that the number and type of light detectors 34 utilized in accordance with the present invention can vary depending on the power required by the motor, described below.

The FIGURE also shows that a small, lightweight electric motor 38 is attached to a gear box 40, preferably by bolting the motor 38 to the gear box 40. It is to be understood that the motor 38, the light detector 34, and the capacitor 30 are electrically interconnected via the circuit board 32. The light detector 34 can be used to charge the capacitor 30 and in turn, the capacitor 30 can be used to provide power the motor 38. Thus, the need for batteries or utility power is obviated.

Although the FIGURE shows only one capacitor 30, it can be appreciated that more than one capacitor can be used. For example, to obtain a higher operating voltage, three capacitors can be connected in series to power a motor coupled to a window covering having plural one inch aluminum slats. In this non-limiting example, each capacitor has a capacitance of 1.5 Farads and the entire bank of three capacitors has a capacitance of 0.5 Farads.

According to the present invention, a user can manipulate the signal generator 28 to generate a signal that is sensed by the signal sensor 26 and sent to signal processing circuitry in the circuit board 32. In turn, the electrical path between the capacitor 30 and the motor 38 is closed to energize the motor 38 and move the window covering open or closed in accordance with the signal generated by the signal generator 28.

It can be appreciated that the photoelectric power supply system of the present invention can be used to power other non-limiting devices such as: laptop computers, hand held computers, telephones, lights, toys, calculators, or any other devices that can be powered by dc power sources.

While the particular PHOTOELECTRIC POWER SUPPLY SYSTEM FOR MOTORIZED WINDOW COVERINGS as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

I claim:

1. A direct current power system for actuating a component, comprising:

at least one capacitor having a rating of at least one-half Farad;

at least one converter receiving light and outputting electricity in response to charge the capacitor; and at least one motor electrically connected to the capacitor and energized thereby, the capacitor being the sole source for power for the motor.

2. The system of claim 1, wherein the actuated component is selected from the group consisting of: window coverings, laptop computers, hand held computers, telephones, lights, toys, and calculators.

3. The system of claim 1, wherein the actuated component is a window blind actuator.

4. A power system for a window covering, comprising:

at least one light detector;

at least one capacitor electrically connected to the light detector, the capacitor having a rating of at least one-half Farad; and at least one motor electrically connected to the capacitor, the capacitor and the light detector being the sole source of power for the motor, the motor moving the window coveting.

5. The system of claim 4, wherein the light detector is a photo-diode.

6. The system of claim 4, wherein the light detector is a photocell.

7. The system of claim 4, wherein the light detector is a solar cell.

8. The system of claim 4, wherein the light detector is a solar panel.

9. The system of claim 4, wherein the capacitor has a capacitance of not less than one-half Farad.

10. A photoelectric power system comprising:

at least one light detector;

at least one capacitor electrically connected to the light detector, the capacitor having a rating of at least one-half Farad; and at least one electrical device electrically connected to the capacitor, the capacitor being the sole source of power for the electrical device, wherein the electrical device is selected from the group consisting of: window coverings, laptop computers, hand held computers, and telephones.

11. The system of claim 10, wherein the light detector is a photo-diode.

12. The system of claim 10, wherein the light detector is a photocell.

13. The system of claim 10, wherein the light detector is a solar cell.

14. The system of claim 10, wherein the light detector is a solar panel.

* * * * *